United States Patent [19]

MacKeighen et al.

[11] Patent Number: 4,600,728
[45] Date of Patent: Jul. 15, 1986

[54] ELASTOMER COMPOSITIONS CONTAINING HUMATES

[75] Inventors: Harold R. MacKeighen, Akron; Vincent T. Cortesi, Cuyahoga Falls, both of Ohio

[73] Assignee: Alfred D. Lobo Co., L.P.A., Cleveland, Ohio

[21] Appl. No.: 758,356

[22] Filed: Jul. 24, 1985

Related U.S. Application Data

[62] Division of Ser. No. 662,388, Oct. 18, 1984.

[51] Int. Cl.⁴ .............................. C08J 9/08; C08J 9/10
[52] U.S. Cl. .................................... 521/84.1; 524/65; 524/76; 524/77; 521/151
[58] Field of Search ........................... 524/65, 76, 77; 521/84.1, 151

[56] References Cited

U.S. PATENT DOCUMENTS

| | | | |
|---|---|---|---|
| 3,075,931 | 1/1963 | Davidson et al. | 524/65 |
| 3,356,623 | 12/1967 | Schwartz | 524/76 |
| 3,533,988 | 10/1970 | Morris et al. | 524/65 |
| 4,532,260 | 7/1985 | MacKeighen et al. | 521/84.1 |

*Primary Examiner*—Morton Foelak
*Attorney, Agent, or Firm*—Alfred D. Lobo

[57] ABSTRACT

Elastomer compositions are provided which contain high molecular weight water-insoluble humic acid humates. The compositions show improved bloom resistance in both the uncured and the vulcanized or otherwise cured state. Methods to make sponge rubber are also disclosed in which the humic acid humate is the gas producing agent. A predominantly humic acid humate containing composition maintains a clean mold, and curing an uncured article coated with the humate at elevated temperature will clean metal molds which have dirty surfaces, particularly when green coated articles are vulcanized in contact with the mold's surfaces.

10 Claims, No Drawings

ELASTOMER COMPOSITIONS CONTAINING HUMATES

This is a division of application Ser. No. 662,388 filed Oct. 18, 1984.

BACKGROUND OF THE INVENTION

Rubber products and the compositions used to produce them are a large economic factor in the world. There is a continuing search for compositions which will enhance the final product either by a cost savings or quality of the product.

The tendency for some vulcanized rubber products to "bloom" creates an undesirable appearance on the finished product. This "bloom" is believed to be a migration of some of the ingredients in the rubber to the surface and once there will form a light colored haze. The "bloom" is believed to be zinc salts and sulfur but also can comprise oils, antizonants, antioxidants and the like. An improvement in the appearance of the finished product could be obtained, if "bloom" could be lessened or eliminated.

"Bloom" in uncured rubber products has a serious effect on the ability of the rubber to stick to adjacent rubber. Many rubber products, such as tires, are plied one layer upon the other in the fabricating or uncured state. If one of these layers has a dry salt type dusting (bloom) on the surface, then the rubber's "tack" (that is, its tendency to want to latch onto the adjacent rubber) is severly reduced. Reduced bloom in the uncured rubber is very much needed.

Another major problem facing producers of rubber articles is the task of cleaning molds used to vulcanize rubber articles. These molds, which are usually metal, have a tendency to build up a scum or char over a period of time. Once the mold reaches a very dirty state, defects can appear in the cured article. Usually, the molds are cleaned when they become dirty enough to effect the product quality. Cleaning the molds is time consuming and results in production down-time. Means of keeping molds clean or better means of cleaning dirty molds are needed for the rubber industry.

Sponge rubber products are large volume rubber products and are used widely as weather stripping for automobiles. In making sponge products, it is customary to incorporate a gas-producing agent in the rubber composition. The composition is heated to a temperature sufficient to release the gas and vulcanize the rubber. Improved sponge rubber compositions are desirable.

As the price and availability of petroleum becomes a problem, there is a greater search for additives to rubber which are not based on oil or natural gas feedstocks. Materials which come from the soil have been an area of interest to rubber formulators. Materials such as clay, silica pigments, calcium carbonate and ground coal have become popular rubber fillers, due to their independence of the petroleum market.

U.S. Pat. No. 3,075,931 discloses rubber compositions have as a reinforcing filler, a partial polyvalent metal salt of coal derived humic acid. The humic acid was obtained by the controlled burning of coal. The humic acids prepared by the controlled oxidation of coal have molecular weights of about 700 to 1400. The humic acid was added to the rubber latex in the form of an aqueous sodium humate solution and then the latex was coagulated using an acid salt such as calcium chloride.

U.S. Pat. No. 3,356,623 teaches using a water soluble salt of humic acid as a dispersing agent in a latex or rubber, precipitating the dispersing agent in situ by adding a water soluble zinc compound and an acid such as hydrochloric acid. The vulcanizing agents and all other compounding ingredients are added to the latex such that the precipitate is a completely formulated, vulcanizable rubber stock.

U.S. Pat. No. 3,533,988 discloses preparing a rubber masterbatch containing a salt of humic acid with a water soluble volatile base such as ammonia or a volatile amine. The humic acid used came from the oxidation of coal and had a molecular weight of from 700 to 1400. The rubber-humic acid masterbatch was dried at about 300° F. (149° C.) to drive off the ammonia. The dried masterbatch was mixed with other compounding ingredients and vulcanized.

Humic acid materials that must be manufactured from the burning of coal are hard, black, brittle solids with relatively low molecular weights (700–1400), and such materials are not suitable for use in our invention.

The elastomer forming industry, and particularly the rubber industry, is constantly searching for more effective and economical fillers which will not adversely affect the properties of shaped articles formed from the rubber compositions used. The humate used in our composition provides such a filler.

SUMMARY OF THE INVENTION

It is an object of this invention to provide novel elastomer compositions comprising an elastomer (polymer) and a sufficient amount of high molecular weight, water-insoluble precipitated humic acid humate to provide a composition capable of being formed into articles of arbitrary shape and desirable properties.

It is a further object of this invention to provide elastomer compositions and methods which can be used in the production of sponge rubber products in which humic acid humate is used as a partial or complete substitute for conventional blowing agents.

It is also an object of this invention to provide elastomer compositions and methods which will clean the surface of dirty metal molds when the elastomer compositions are formed into articles of arbitrary shape by molding at elevated temperature, in contact with the metal molds. By "elevated temperature" we refer to a temperature above 100° C. but below that required to gasify the humic acid humate. Though such articles may be only thermoformed, they are preferably cured with suitable catalysts, for example dicumyl peroxide or other organic catalysts, or more preferably vulcanized with suitable vulcanizing agents, as is well known in the art.

These and other objects are accomplished by the addition of the humic acid humate to a rubber formulation as described in an article in "Rubber & Plastic News" by R. H. MacKeighan and V. T. Cortesi, October 1984 the disclosure of which is incorporated by reference thereto as if fully set forth herein. The level of humic acid humate used is from about 1 to about 300 parts by weight, preferably from about 10 to about 100 parts by weight, based on 100 parts by weight of elastomer. Only relatively high molecular weight, water-insoluble, precipitated humic acid humate having a carbon content from about 20 percent to about 60 percent, and preferably from about 25 percent to about 50 percent is most effective in our invention. Most preferred is solid finely divided humic acid humate having a true specific gravity in the range from about 1.4 to about 1.8, and a primary particle size smaller than 180 microns.

DETAILED DESCRIPTION OF PREFERRED EMBODIMENTS

Humic acid humates which are suitable for use in this invention are those which are hypothesiszed to have humic acid, which is a macromolecular geopolymer, as the major constituent, generally in excess of 75% by weight. Humic acid has been defined as that portion of the soil organic matter which is soluble in base and insoluble in mineral acid and alcohol. The particular humic acid of our invention is a hydrophilic, reversible colloid, the molecular weight of which ranges from about 2,000 to about 1,300,000. The number average molecular weight appears to be in the range of from about 20,000 to about 50,000 measured by gel permeation chromotography (GPC).

Typically, the C/O ratio obtained from an elemental analysis is in the range from about 1 to about 2.5, more preferably from about 1.8:1, to 2:1. The C/H ratio is in the range from about 9.5 to about 17.5, more preferably from about 12:1 to about 15:1. The most preferred humates are generally characterized with a high ash content, greater than 5% by wt, and in particular instances greater than 20% by wt. It will be appreciated that the ash content is not deemed to account for the particular desirability of the humates but it is a characteristic which appears not to be deleterious to the effectiveness of the material.

The term "humic acid humate" is used throughout the specification and claims because the precipitated humate is commonly referred to in the industry by this term which refers to the product of decayed plant and animal material (humus). The preferred humic acid humates employed in this invention are distinguished from other humates in that the material we use is generally derived by flocculation and precipitation from alkaline solutions of humic substances derived from natural humus found in association with material in the earth. (See *Humic Substances in the Environment* by M. Schitzer and S. U. Khan, Marcel Dekker, New York, 1972). Such preferred humates may also be obtained by precipitation from some lakes in which the water is slightly alkaline and characteristically brown because of the dissolved organic material.

Other naturally occurring earth sources include "leonardite", an oxidized form of lignite found chiefly in South Dakota and in the Menefee formation in northwest New Mexico. A most preferred source of humic acid humate is one derived from humic substances found in association with titanium mineral deposits. Titanium mineral deposits include, for example, ilmenite and rutile sand deposits. Titanium mineral sand deposits are found in several places throughout the world. In the United States, titanium sand deposits are located in Florida, Georgia and South Carolina. Titanium rock deposits may be found in the Adirondack mountains of New York State.

Humic acid humates suitable for use in the invention are believed to have humic acid as a substantial, and probably predominant constituent with a carbon content from about 20 percent to about 50 percent, and more preferably from about 30 percent to about 40 percent. The humic acid humates also contain minor ammounts of metals such as aluminum, titanium, iron and calcium. The precipitated humic acid humates used in this invention are recovered by known methods disclosed, for example, in U.S. Pat. No. 3,111,404; these humates are insoluble in water but soluble in basic solutions such as aqueous alkaline metal hydroxide or ammonium hydroxide solutions, the solubility increasing with the concentration of base in solution.

The natural or synthetic curable elastomeric composition contains an effective amount of high-ash humate sufficient to provide the cured composition with desirable physical and chemical properties. The amount of humic acid humate used in the elastomer compositions of this invention will vary depending upon the properties desired and the end use of the product. The amount of humic acid humate found useful is in the range from about 1 to about 300 parts by weight, preferably from about 10 to about 100 parts by weight based on 100 parts by weight of elastomer.

The composition is preferably based on a vulcanizable synthetic rubber polymer such as polybutadiene which may be blended with smoked sheet plantation rubber, or any of various sulfur-vulcanizable synthetic rubbers other than polybutadiene, preferably cis-polyisoprene which is essentially identical with natural rubber; or, the composition may be any other sulfur-vulcanizable synthetic elastomer such as elastomeric butadiene-styrene copolymers, or one of the EPDM rubbers which are polymers of ethylene and propylene together with a small proportion of a di-unsaturated monomer which makes the polymer sulfur-vulcanizable; or, the composition may be a catalyst-curable synthetic elastomer such as the nitrile rubbers, and thermoplastic elastomers selected from the group consisting of styrenic, olefinic, urethanic and copolyesters, for example Santoprene ® fully polymerized polyolefinic monomers commercially available from Monsanto Chemical Company.

Synthetic rubbers of the type specified above can be made from various raw materials which produce polymers of different kinds. Thus, dienes such as butadiene, isoprene, piperylene, chlorobutadiene, and the like, may be polymerized alone or in admixture with each other or with minor proportions of vinyl or vinylidene compounds such as styrene, vinyl acetate, methyl methacrylate, vinyl pyridine, acrylic acid, acrylonitrile, and the like, either while emulsified in water so as to produce a polymer latex, or while dissolved in a volatile solvent so as to produce a solution. Isobutene may be polymerized with a small proportion of butadiene or isoprene to produce butyl rubber. Ethylene and propylene together with a diene may be polymerized to produce so-called EPDM rubber. Ethylene oxide alone or mixed with propylene oxide or epichlorohydrin, or tetrahydrofuran alone, may be polymerized to produce polyether rubbers. Butadiene and acrylonitrile may be copolymerized to produce nitrile rubbers.

These are only a few of the known varieties of synthetic rubber, but are those presently considered to be most likely to be useful in the practice of this invention. The polymerization catalysts, dispersion media (water or solvent), reaction conditions, and finishing procedures to prepare them in the type specified above are well known but differ somewhat depending on the nature of the chosen monomer and the nature of the dispersion medium, whether water to produce a latex, or a solvent to produce a solution.

The precipitated humic acid humates are useful when dispersed in an essentially homogeneous mixture with raw natural or synthetic elastomers now available to manufacturers of rubber products such as gaskets, tires, and the like, and of window stripping, pipe insulation and the like foamed open or closed cell, but particularly closed cell sponge-like materials. The elastomers include natural rubber (essentially cis-1,4-polyisoprene) from trees, and aforesaid synthetic polymers and copolymers made either in latex form or in solution, from various monomers and mixtures of monomers; the synthetic polymers which are considered to be especially suitable for making formed rubber products are latex copolymers of butadiene and styrene (SBR); solution polymers of butadiene or of isoprene; solution copolymers of butadiene and styrene; solution copolymers of isobutene with isoprene (butyl rubber); and solution terpolymers of ethylene, propylene, and a diene (EPDM rubber). These are supplied both as essentially uncompounded polymers (with no additives other than antioxidants and small quantities of residues of materials employed for polymerization), and as masterbatches with various grades of carbon black and with paraffinic, naphthenic, or aromatic oils. The high-ash humate is particularly useful as a partial substitute for reinforcing carbon, calcium carbonate and/or silica in convntional elastomer compositions.

In addition to the elastomers and humic acid humate, the compositions of this invention may contain other compounding ingredients which are normally used in rubber compounds. Examples of these ingredients are fillers such as carbon black, clay, zinc oxide, titanium dioxide and the like; curing agents such as sulfur, peroxide sulfenamide accelerators and the like; plasticizers and processing aids such as aromatic oils, aliphatic oils, waxes, peptizers and the like; age resistors such as antiozonants, antioxidants and the like, though the humates themselves provide these properties. Examples of suitable carbon blacks are those with ASTM designations N110, N119, N234, N303, N330, N339, N347, N351, N550, N660, N765, N774, N785, N990, chanel blacks and the like.

The elastomer compositions of this invention may be prepared by mixing the ingredients together on a two-roll mill or by internal rubber mixers such as Banbury mixers, extruder mixers and the like. For those compositions where tensile strength is of minor importance, a very suitable mixing technique is to add all the ingredients to the mixer at the beginning of the mixing cycle. The humic acid humate aids in the dispersing of the other compounding ingredients and results in a faster mix cycle time than with compounds not having the humic acid humate as an ingredient. This is quite surprising in that normally when additional fillers are added, the mixing cycle time becomes longer.

After mixing, the elastomer compositions of this invention may be calendered, extruded and shaped into the desired elastomer product befor vulcanization.

The elastomer compositions of this invention show many unusual properties. For example, when part or all of the carbon black in a conventional sponge rubber formulation is replaced with the humic acid humate, part or all of the blowing agent conventionally used may be unnecessary to obtain a high quality sponge rubber. Thus, the humate functions as a fugitive blowing agent.

It will be recognized that humate-filled shaped articles may be formed solely by thermoforming an elastomer, as for example with Santoprene ®, provided the temperature is below that at which the humate decomposes to form a gas (that is, gasified). If the temperature is high enough to gasify the humate, a closed cell foam is formed, the size of the cells being a function of the size of the humate particles and the temperature, inter alia, as is well known in the art.

In other embodiments, catalyst-cured and vulcanized shaped articles are produced, whether sponge-like (foam) or not, and the physical and chemical properties of both the uncured and cured articles are affected by the amount and particular characteristics of the humic acid humate used, which amount is best determined by a little trial and error such as one skilled in the art will expect to make for a particular article.

To obtain a sponge rubber product according to this invention, the humic acid humate is mixed with the rubber and remaining compounding ingredients. After mixing the composition, the sponge composition is vulcanized. Vulcanization may occur by passing a strip of compound unrestrained through a hot salt bath. The salt bath is maintained at a temperature sufficient to vulcanize the sponge compound and to cause gas to be released from the formulation thus blowing the compound into a sponge rubber. The preferred temperature is from about 300° F. (149° C.) to about 450° F. (232° C.)

When mixing the sponge formulation, the temperature during mixing should not reach a temperature which will cause the gas to be released from the humic acid humate. The gas released from the humic acid humate is believed to be carbon dioxide and nitrogen and is released at temperatures over about 250°–300° F. (121°–149° C.).

A sponge may also be prepared by placing the sponge formulation in a partially filled mold. Upon heating, the formulation will blow and expand such as to fill the mold. This method allows for a more controlled density of the sponge than the unrestricted vulcanization method.

Another unusual property of the compositions of this invention is their ability to clean metal molds. The compositions when vulcanized in a metal mold will maintain the mold in a clean state or even remove the dirty buildup from a mold which was used before to vulcanize conventional rubbers.

The mold cleaning properties of the humic acid humate of this invention may be accomplished by mixing the humic acid humate in the rubber compound that is in contact with the metal mold during vulcanization or by applying humic acid humate to the exterior of the unvulcanized rubber article. When applied to the exterior as a coating, the humic acid humate may be mixed with other ingredients such as rubber latex, carbon black, clays, silicons, oils and the like. Such mixtures are commonly referred to as mold release paints and are usually sprayed or brushed on the unvulcanized rubber article and serve as an aid in mold flow of the rubber and as a release agent to cause the rubber to release from the metal mold.

The compositions of this invention also show improved tack in the uncured state, which probably results from the absence of bloom on the surface of the rubber. This is a very desirable property for rubber compounds which for the manufacture of certain articles must be plied one on the other. Bloom on the surface of uncured rubber destroys tack such that a layer of rubber will not adhere to an adjacent layer. Also, bloom on the cured article results in poor appearance of the cured rubber article. Quite surprisingly, rubber compositions comprising humic acid humates are substantially free of bloom both in the cured and uncured state.

This invention is more fully illustrated by the following examples.

EXAMPLE I

This example is presented to show a method of producing a sponge rubber according to this invention with a humic acid humate rubber composition. The following formulation was used:

| Ingredient | Parts by Weight |
| --- | --- |
| Ethylene Propylene diene rubber[1] (Oil extended with 50 parts oil) | 150 |
| Humic Acid humate[2] | 80 |
| Wingtack 95[3] | 10 |
| Zinc Oxide | 5 |
| Stearic Acid | 1 |
| VoCol S[4] | 3.2 (2 parts active) |
| TMTD[5] | 1 |
| Santocure NS[6] | 2 |
| Sulfur | 1 |

[1]Polysar EPDM 6463
[2]Titatium sand humate having a carbon content of 33%
[3]Polyterpene resin from Goodyear
[4]Zinc-O—, O—di-N—butylphosphorodithioate on inert carrier
[5]Tetramethylthiuram Disulfide
[6]Butyl Benzothiazole Sulfenamide the above formulation was mixed in a Banbury mixer by adding all the ingredients, except the sulfur, to the mixer and mixing about 4 minutes. The mix was then dumped on a mill and the sulfur was added on the mill and mixed into the rubber. The mixed compound was removed from the mill in strip form and fed to an extruder. A strip was extruded and passed through a saline bath which was at 400° F. (205° C.). The extruded strip was in the bath for 3 minutes. The strip was then rinsed to remove any salt and cooled. An examination of the strip shows that a high quality sponge rubber is produced by this method. The cells of the sponge are observed to be very even in size and uniformally distributed.

EXAMPLE II

This example is presented to show the mold cleaning ability of a rubber composition containing humic acid humate. The formulation of Example I is vulcanized in a partially filled dirty mold. The expansion of the compound into a sponge fills the mold and the rubber is in contact with all the internal surfaces of the mold. Upon removal of the vulcanized rubber the mold is clean. This result is very unexpected.

Compositions of this invention containing humic acid humate were found to have improved tack in the uncured state and to be free of bloom in the uncured and vulcanized state.

Sponge rubber compositions of this invention are useful for automotive weather stripping, carpet underlay and the like. The mold cleaning aspects of humic acid humates are useful in operations where rubber is vulcanized in metal molds such as molded goods, tires and the like.

We claim:

1. A foamable composition for forming a shaped article comprising a formable curable elastomer together with an effective amount of water-insoluble precipitated humic acid humate sufficient to provide the shaped article with desirable physical and chemical properties, wherein said humic acid humate has a number average molecular weight of from about 2,000 to about 1,300,000 and has a carbon content of from about 20 percent to about 60 percent and is a finely divided solid having a primary particle size smaller than about 180 microns.

2. The composition of claim 1 wherein said humic acid humate has a carbon content of from about 30 percent to about 40 percent and said particle size is smaller than about 45 microns.

3. The composition of claim 2 wherein said humic acid humate has a number average molecular weight of from about 20,000 to about 50,000, and a true specific gravity in the range from about 1.4 to about 1.8.

4. The composition of claim 2 wherein said humic acid humate is derived from organic matter in titanium sand.

5. The composition of claim 1 wherein said humic acid humate is present in an amount from about 1 to about 300 parts by weight per 100 parts by weight of vulcanizable rubber.

6. The composition of claim 5 wherein said humic acid humate is present in an amount from about 10 to about 100 parts by weight per 100 parts by weight of vulcanizable rubber.

7. A vulcanized composition of claim 1.

8. A shaped article comprising a curable elastomer together with an effective amount of waterinsoluble precipitated humic acid humate sufficient to provide the shaped article with desirable physical and chemical properties, wherein said humic acid humate has a number average molecular weight of from about 2,000 to about 1,300,000, and is a finely divided solid having a true specific gravity in the range from about 1.4 to about 1.8 and a primary article size smaller than 180 microns.

9. The shaped article of claim 8 wherein said elastomer is natural or synthetic rubber in which is dispersed a vulcanizing agent, which article upon vulcanization produces a shaped vulcanized article.

10. The shaped article of claim 8 wherein said humic acid humate is a filler which also provides reinforcing and protection against oxidation and ozonation.

* * * * *